J. ASPINWALL.
MOWER.
APPLICATION FILED DEC. 20, 1919.

1,348,471.

Patented Aug. 3, 1920.

Inventor
John Aspinwall
By his Attorney
Gorham Crosby

UNITED STATES PATENT OFFICE.

JOHN ASPINWALL, OF NEWBURGH, NEW YORK.

MOWER.

1,348,471.  Specification of Letters Patent.  Patented Aug. 3, 1920.

Application filed December 20, 1919. Serial No. 346,268.

*To all whom it may concern:*

Be it known that I, JOHN ASPINWALL, citizen of the United States, and resident of Newburgh, in the county of Orange and State of New York, have invented certain new and useful Improvements in Mowers, of which the following is a specification.

My invention relates to improvements in mowers, and more particularly to lawn mowers and the arrangement of cutting knives therein.

In the common form of lawn mower there is provided a set of rotary cutting blades cooperating with a stationary knife. The stationary knife is commonly made of steel and is relatively thin and is therefore liable to become bent or broken should the mower encounter hard objects such as stones, etc. The main object of my invention is to provide an arrangement in which this tendency is substantially decreased or eliminated. A further object is to provide an arrangement in which the stationary knife may be reversed in a new way so that after one edge has become largely worn away or injured the other edge may be used for cutting. Further objects, features and advantages will more clearly appear from the detail description given below taken in connection with the accompanying sheet of drawings which form a part of this specification.

Figure 1:
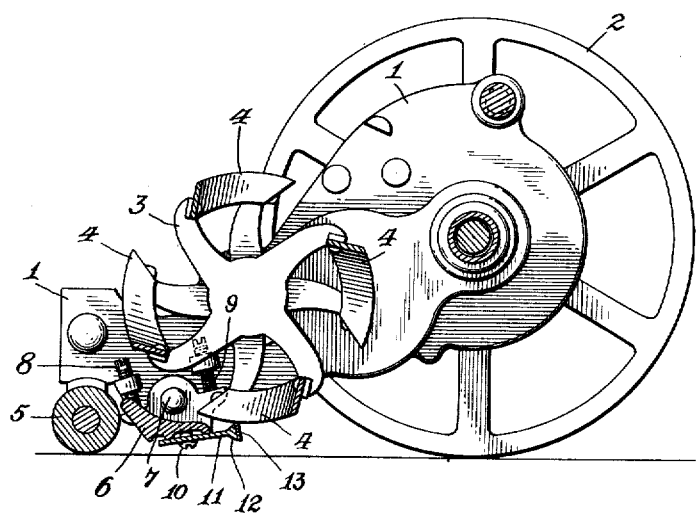
Figure 2:
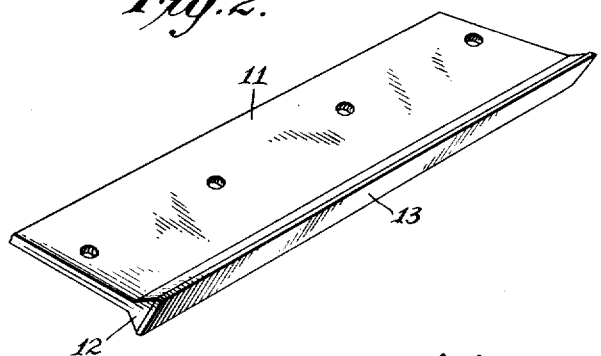

In the drawings Figure 1 represents a central vertical section of a lawn mower embodying my improvements in a preferred form and Fig. 2 is a perspective view of the knife bar.

Referring to the drawings 1 represents one of the side frames of the lawn mower and 2 one of the ground wheels. 3 represents the rotary cutter having cutting blades 4, and 5 represents the rear supporting roller of the machine. It will be understood that the rotary cutter may be driven in any suitable manner from the ground wheels 2. 6 represents a supporting cross member secured to the side frames 1 by bolts 7 and adjusted about said bolts as pivots by adjusting screws 8 and 9. Removably secured to the underneath side of the cross member 6, as by screws 10, is a knife bar 11, substantially horizontally arranged and enlarged along one edge thereof as shown at 12. Secured to this edge, in an upright position, is a steel knife 13, the upper edge of which is adapted to be engaged by the blades 4 of the rotary cutter to perform the cutting operation. The member 11 is made of relatively tough steel or iron and the enlarged edge thereof extends upwardly substantially to the upper cutting edge of the knife 13, so that it forms a relatively tough backing for the relatively hard and brittle steel knife 13 thereby decreasing the tendency of the cutting knife 13 to become bent or broken should the mower encounter hard objects such as stones, etc. The enlarged portion 12 also extends downwardly substantially to the lower edge of the knife 13 so that this edge is similarly protected.

As the upper edge of the knife 13 gradually wears away in the normal use of the mower, it will be seen that the area of contact between it and the blades 4 does not become substantially greater so that there is no substantial increase in friction. As the knife 13 becomes worn away, it is true, the rotary cutting blades 4 will engage a greater and greater area of the enlarged portion 12, but this being of relatively soft material does not materially increase the friction. It will be understood that as the knife and blades wear away the position of the knife bar 11 will be adjusted by means of screws 8 and 9 so as to keep the knife 13 and blades 4 near enough together to properly perform the cutting operation. After the upper edge of the knife 13 has been substantially worn away or in case it should become bent or injured the whole knife bar may be reversed or inverted by removing the screws 10 and replacing the knife bar with the other edge of the knife 13 coöperating with the rotary cutter. The knife 13 will still retain its upright position and operate as before. The hard steel knife 13 may be secured to the enlarged edge of the member 11 in any suitable manner although I prefer to weld it thereto by rolling it on under welding conditions in a manner well understood by those skilled in the art.

Although I have described my improvements in great detail and with respect to a preferred embodiment thereof, I do not desire to be limited to such details or embodiments since many changes and modifications may be made and the invention embodied in widely differing forms without departing from the spirit and scope of the invention in its broader aspects.

What I claim as new and desire to secure by Letters Patent, is:

1. In a mower, a rotary cutter and a relatively stationary knife bar comprising a relatively tough member and a thin steel knife secured thereto, the steel knife being substantially rectangular in cross section and arranged in upright position on said tough member with the tough member substantially covering the back flat face of the knife to decrease the tendency of the cutting edge of the knife to become bent or broken.

2. In a mower a rotary cutter and a relatively stationary knife bar comprising a relatively tough horizontally arranged member removably secured to the frame of the mower and enlarged along one edge thereof and a steel knife secured in upright position to said enlarged edge so that the upper edge of the knife is operatively engaged by the rotary cutter.

3. In a mower a rotary cutter and a relatively stationary knife bar comprising a relatively tough horizontally arranged member removably secured to the frame of the mower and enlarged along one edge thereof and a steel knife secured in upright position to said enlarged edge so that the upper edge of the knife is operatively engaged by the rotary cutter, said knife bar being removably secured to the mower whereby it may be inverted so that the other edge of the steel knife will be operatively engaged by the rotary cutter.

4. In a mower, a rotary cutter and a relatively stationary knife bar comprising a relatively tough member and a thin steel knife secured thereto, the steel knife being substantially rectangular in cross section and arranged in upright position on said tough member with the tough member substantially covering the back flat face of the knife to decrease the tendency of the cutting edge of the knife to become bent or broken, said knife bar being removably secured to the mower whereby it may be inverted so that the opposite edge of the knife will be operatively engaged by the rotary cutter.

5. A knife bar for mowers comprising a relatively tough steel or iron member enlarged along one edge and a steel knife secured against the enlarged edge of the tough member whereby the knife is provided with a relatively tough backing to decrease the tendency of the cutting edge of the knife to become bent or broken.

6. A knife bar for mowers comprising a relatively tough steel or iron member and a steel knife secured along one edge thereof in a plane substantially at right angles to the general plane of the tough member, the tough member being enlarged along its edge to which the knife is secured and extending substantially to the cutting edge of the knife whereby the knife is provided with a relatively tough backing to decrease the tendency of the cutting edge of the knife to become bent or broken.

7. In a mower a rotary cutter and a relatively stationary knife bar comprising a relatively tough horizontally arranged member removably secured to the frame of the mower and enlarged along one edge thereof both upwardly and downwardly and a steel knife secured in upright position to said enlarged edge so that the upper edge of the knife is operatively engaged by the rotary cutter, the enlarged portion extending upwardly substantially to the upper edge of the knife and downwardly substantially to the lower edge of the knife and said knife bar being adjustably secured in the mower whereby it may be reversed so that either edge of the steel knife may be used to coöperate with the rotary cutter.

8. In a mower a rotary cutter and a relatively stationary knife bar comprising a relatively tough member having an upturned edge and a steel knife secured in upright position against the upturned part of the tough member and coöperating with the rotary cutter, the upturned part of the tough member extending upwardly substantially to the cutting edge of the steel knife, to decrease the tendency of the knife to become bent or broken.

Signed at New York city, in the county of New York and State of New York, this 19th day of December, A. D. 1919.

JOHN ASPINWALL.